Figure 4:
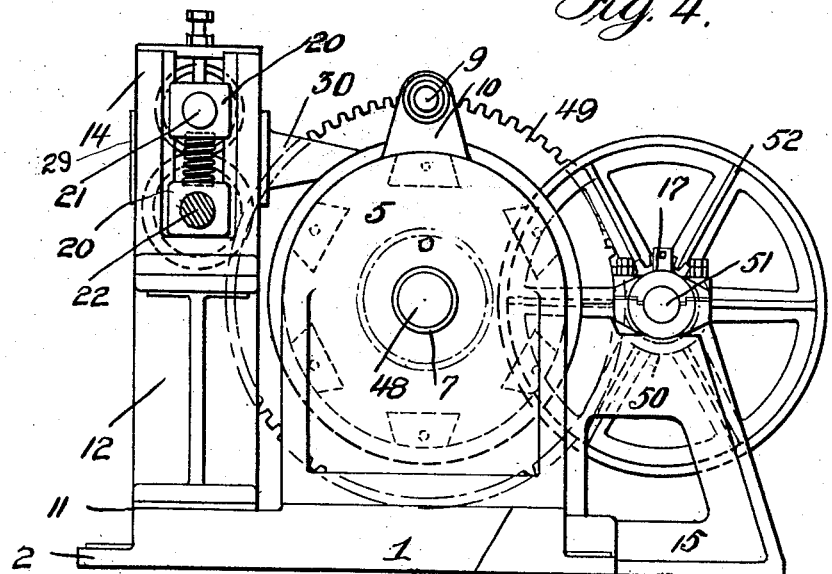

No. 895,976. PATENTED AUG. 11, 1908.
U. G. DAVIS.
NUT MAKING MACHINE.
APPLICATION FILED JAN. 2, 1907.
8 SHEETS—SHEET 1.
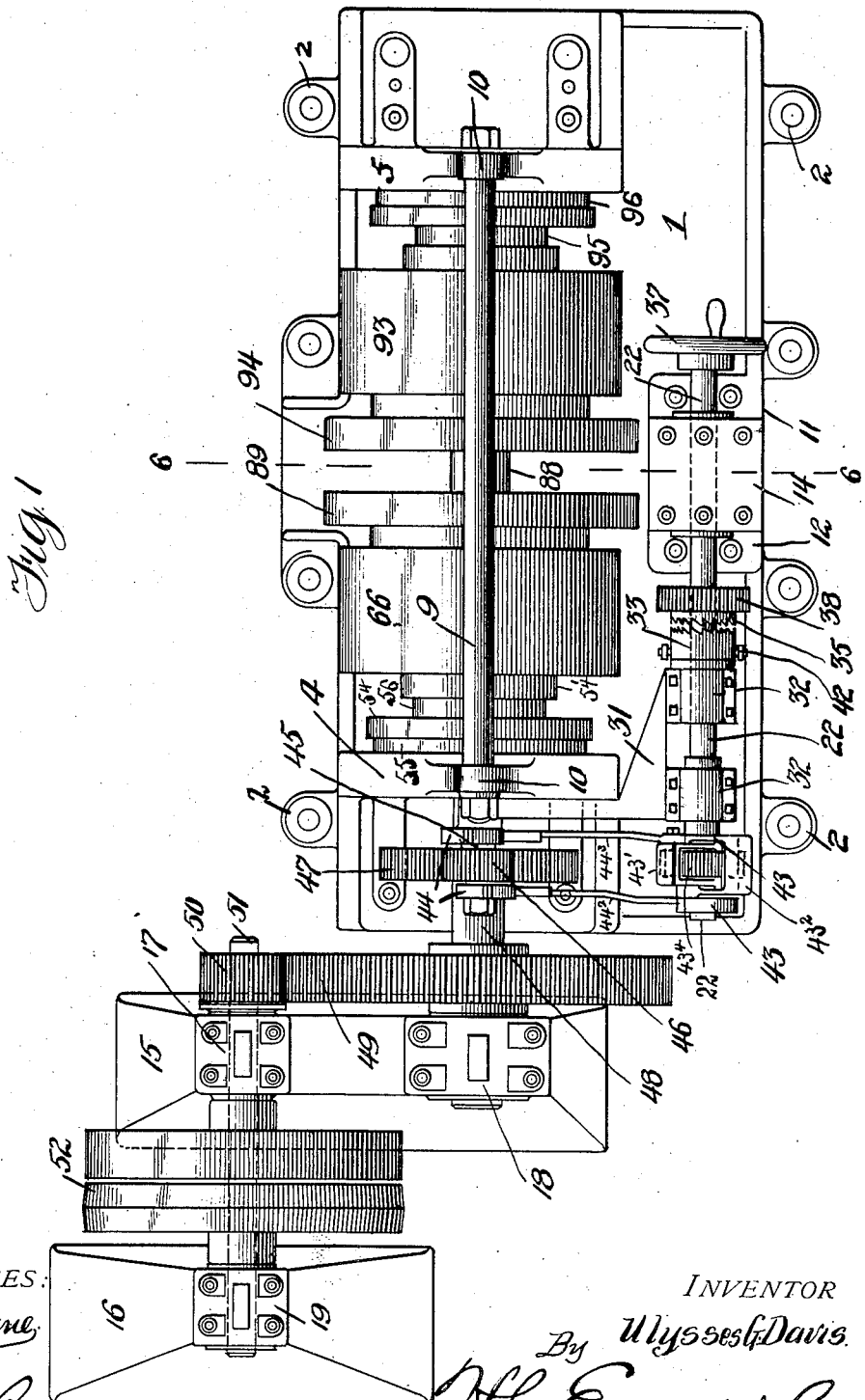
WITNESSES
Sam'l Payne
R. N. Butler
INVENTOR
Ulysses G. Davis
By H. C. Everett Co.
Attorneys

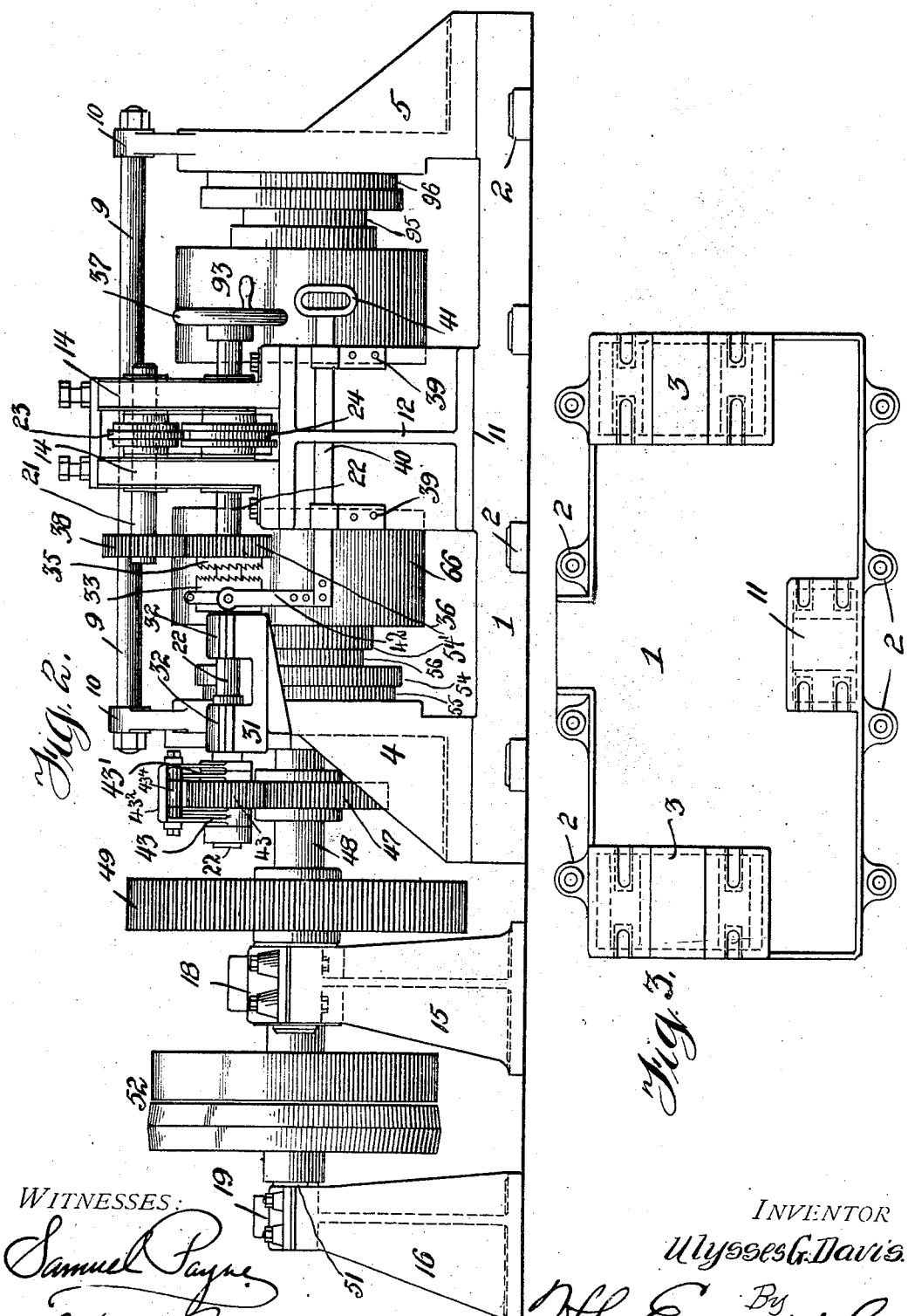

No. 895,976.  
U. G. DAVIS.  
NUT MAKING MACHINE.  
APPLICATION FILED JAN. 2, 1907.

PATENTED AUG. 11, 1908.

8 SHEETS—SHEET 3.

WITNESSES:  
Samuel Payne

INVENTOR  
Ulysses G. Davis.  
BY H. C. Everitt Co.,  
Attorneys

No. 895,976. PATENTED AUG. 11, 1908.
U. G. DAVIS.
NUT MAKING MACHINE.
APPLICATION FILED JAN. 2, 1907.
8 SHEETS—SHEET 4.
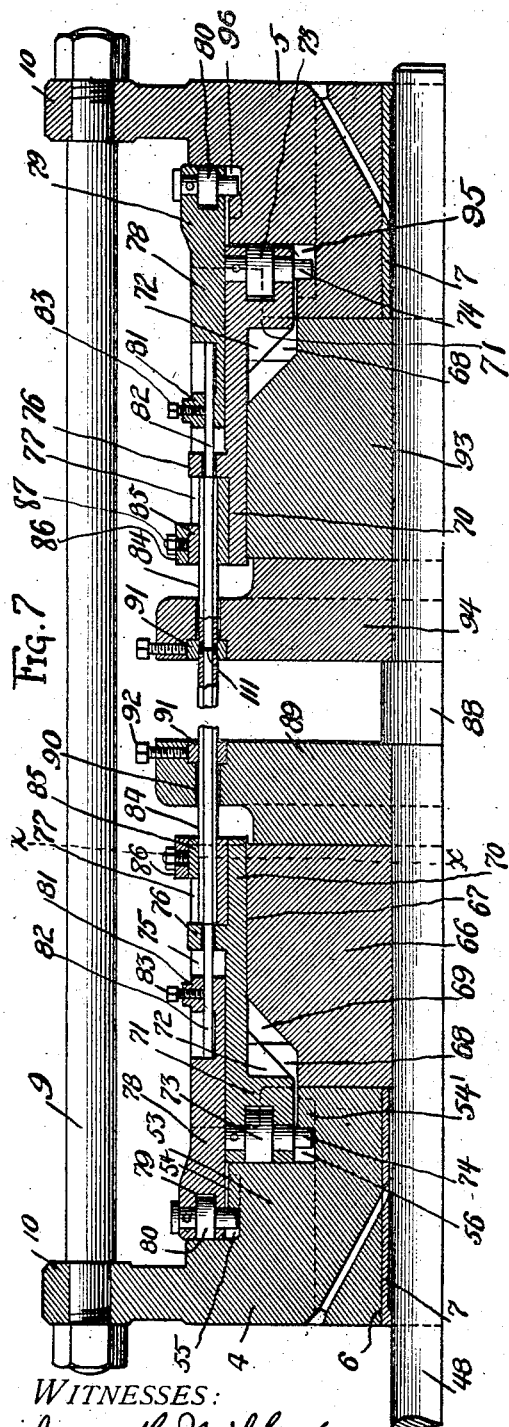
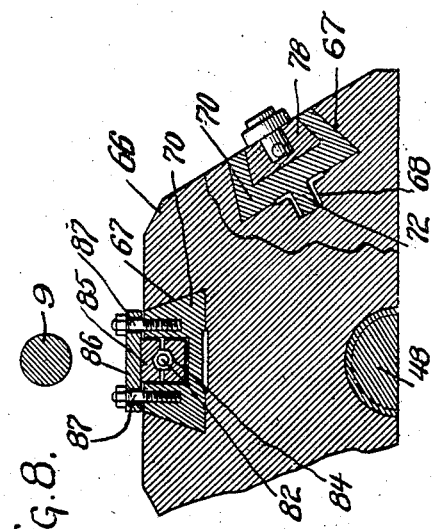
WITNESSES:
INVENTOR
Ulysses G. Davis.
BY H. C. Evert & Co.
Attorneys

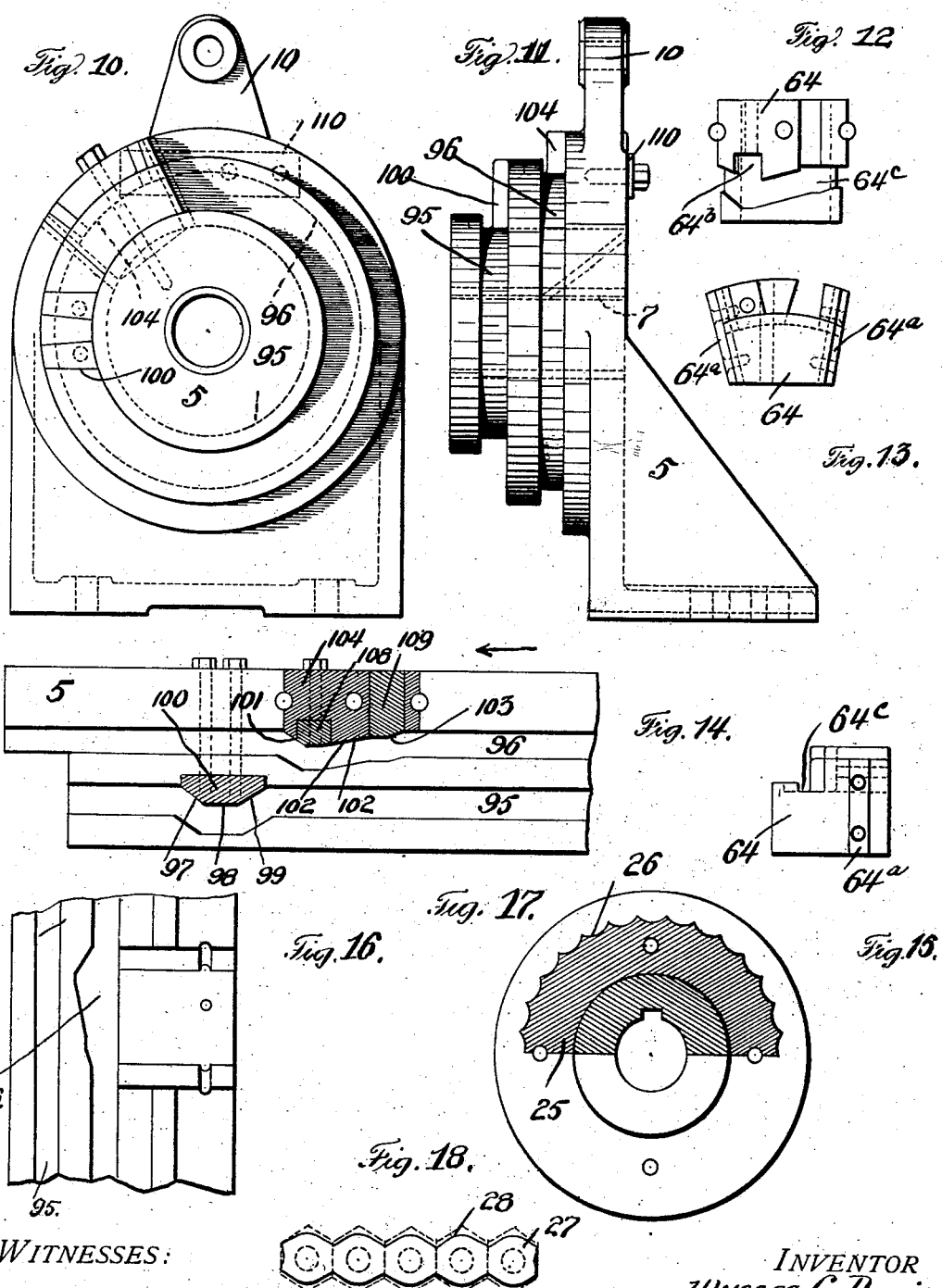

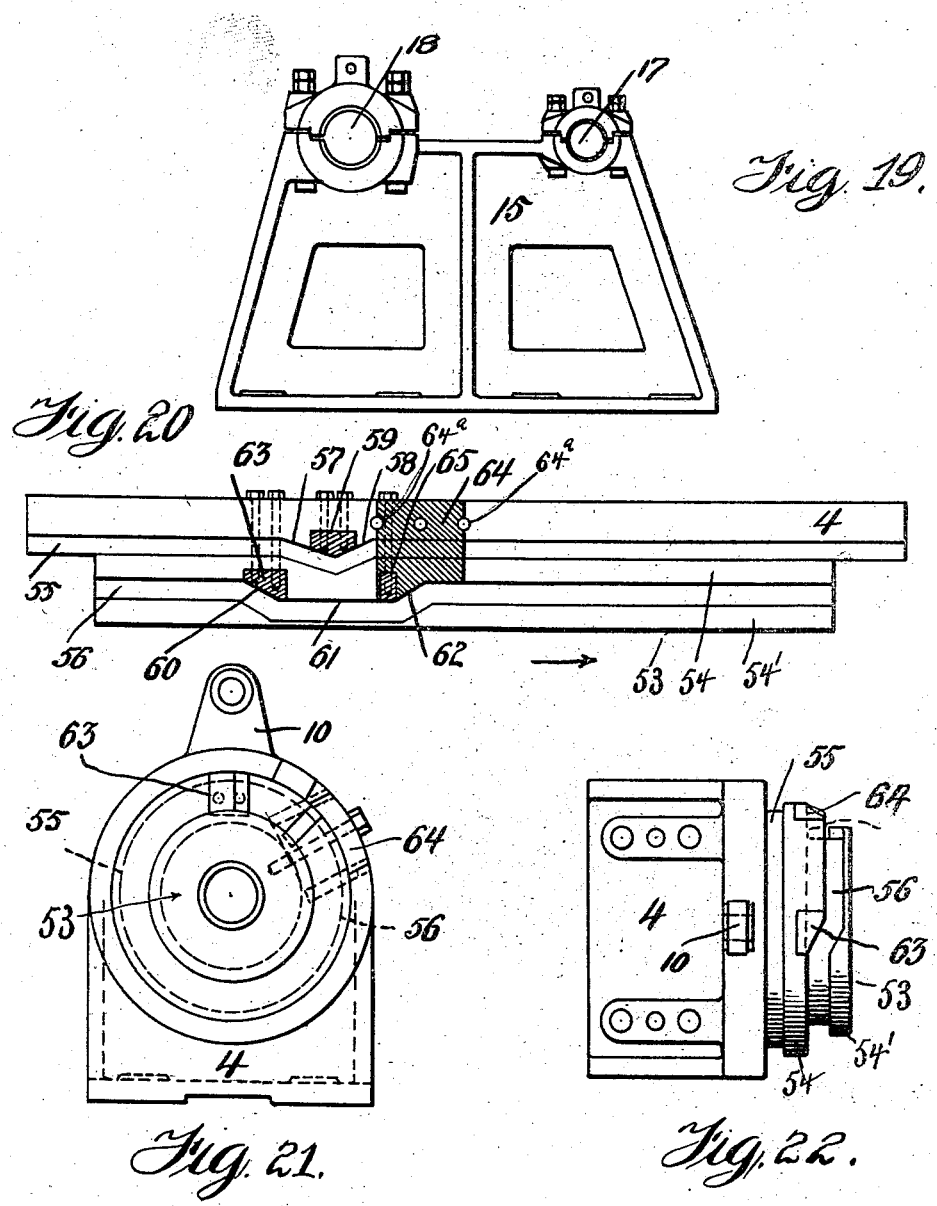

No. 895,976. PATENTED AUG. 11, 1908.
U. G. DAVIS.
NUT MAKING MACHINE.
APPLICATION FILED JAN. 2, 1907.
8 SHEETS—SHEET 7.
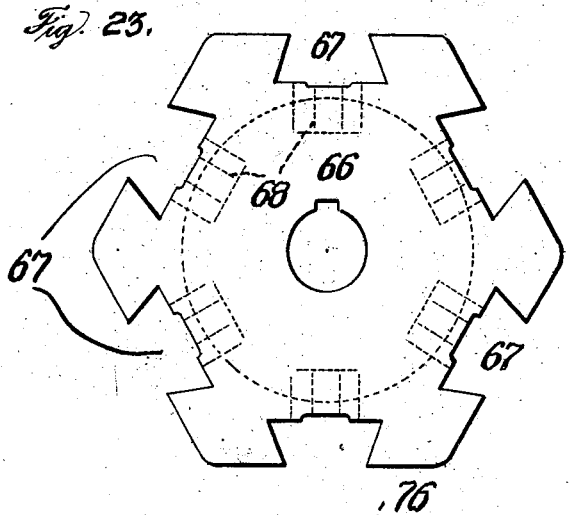
Fig. 23.
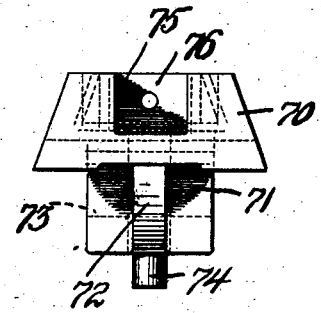
Fig. 24.
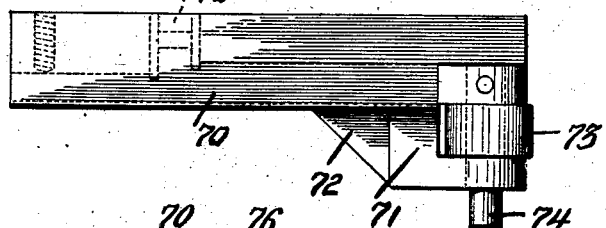
Fig. 25.
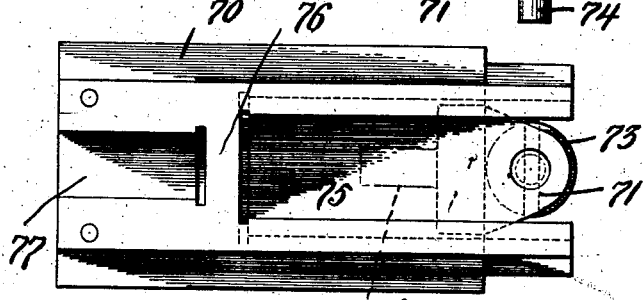
Fig. 26.
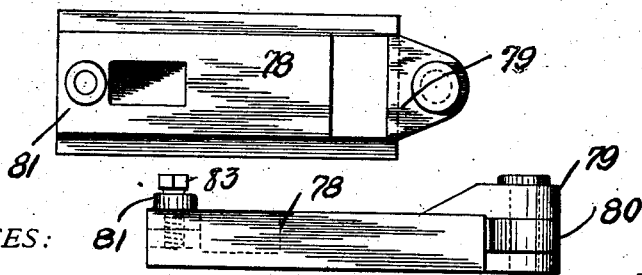
Fig. 27.
Fig. 28
WITNESSES:
A. H. Rabság
R. H. Butler
INVENTOR
Ulysses G. Davis
BY H. C. Evert & Co.
Attorneys No. 895,976. PATENTED AUG. 11, 1908.
U. G. DAVIS.
NUT MAKING MACHINE.
APPLICATION FILED JAN. 2, 1907.
8 SHEETS—SHEET 8.
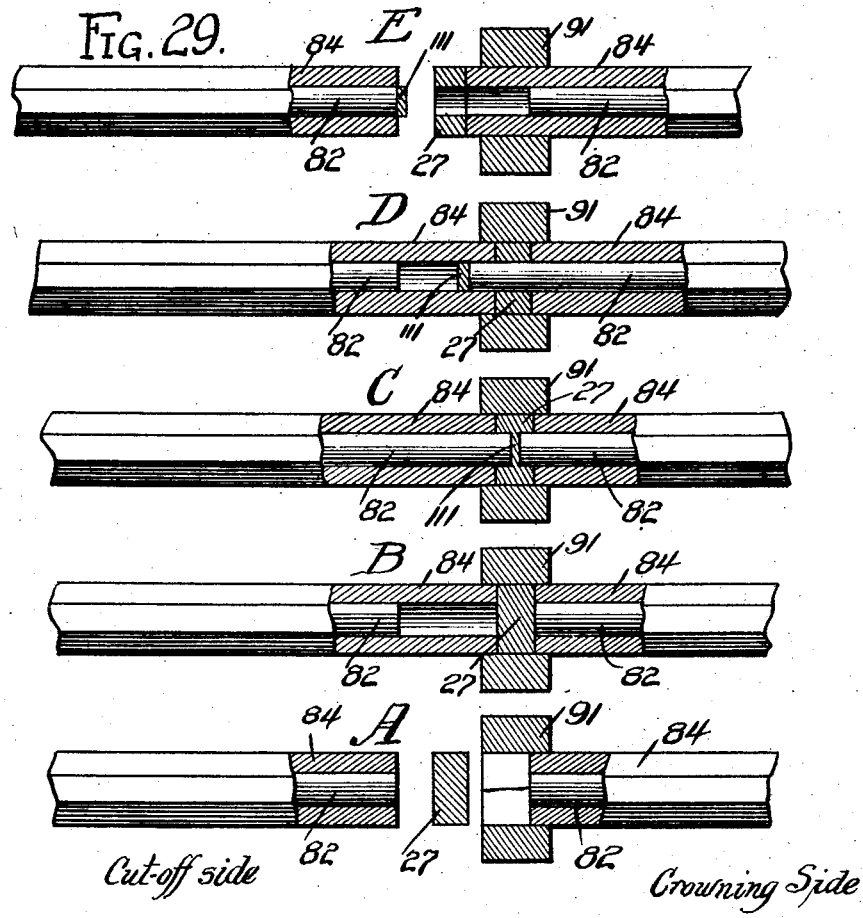
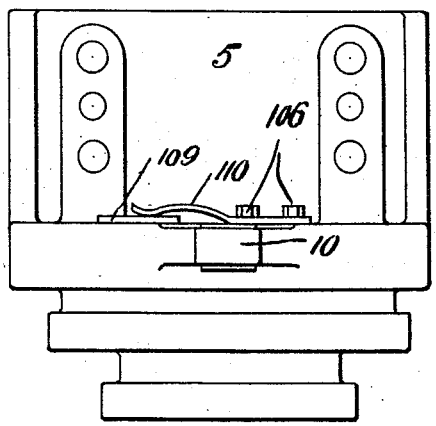
WITNESSES:
Samuel Payne
R. N. Butler
INVENTOR
Ulysses G. Davis.
BY H. C. Evert & Co.
Attorneys

UNITED STATES PATENT OFFICE.

ULYSSES G. DAVIS, OF PITTSBURG, PENNSYLVANIA.

NUT-MAKING MACHINE.

No. 895,976.   Specification of Letters Patent.   Patented Aug. 11, 1908.

Application filed January 2, 1907. Serial No. 350,423.

*To all whom it may concern:*

Be it known that I, ULYSSES G. DAVIS, a citizen of the United States of America, residing at Pittsburg, in the county of Allegheny and State of Pennsylvania, have invented certain new and useful Improvements in Nut-Making Machines, of which the following is a specification, reference being had therein to the accompanying drawing.

This invention relates to nut making machines, designed for continuously producing nuts of a square, octagon, or hexagon contour or similar shape.

The invention has for its primary object to provide a machine of the above type wherein blank forming rolls and revoluble punch and die carrying heads are employed for continuously producing perfectly formed nuts.

The invention further aims to provide a strong, durable and easily operated machine having positive and reliable means for effecting a blank formation and the punching of said blanks.

The invention in its broadest aspect involves available means for rapidly producing a nut from a suitable blank, the production of said nut being easily and quickly accomplished during the operation of forming other nuts. To this end, I have devised a machine embodying a plurality of structural elements which when combined produce a safe and comparatively inexpensive machine.

The principal elements of the invention,—namely a base plate and bearings, blank forming and feeding rolls, roll operating mechanisms, a cut-off head, a crowning head, together with the general operation of these elements,—will be hereinafter separately and specifically described in detail, together with the novel arrangement and objects accomplished from such a combination of elements.

The preferred embodiments of my invention are illustrated in the drawings accompanying this specification; but I desire it to be understood that the same are susceptible to various changes without departing from the scope of the invention.

Reference now being had to the drawings accompanying this specification, similar numerals of reference designate corresponding parts throughout the several views in which:—

Figure 5:
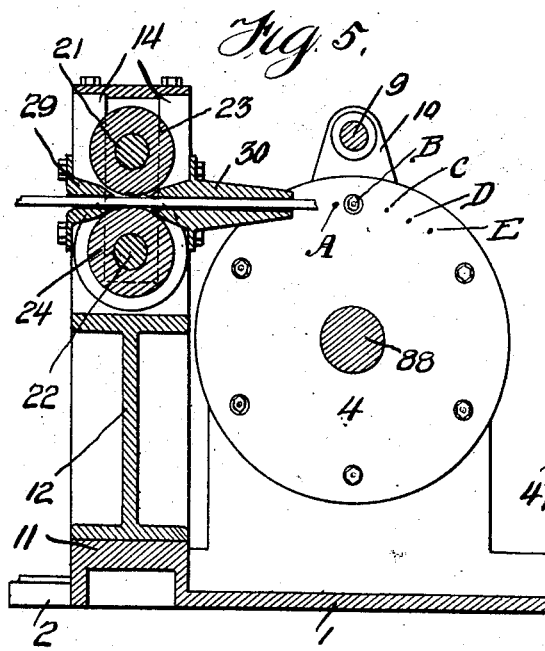
Figure 6:
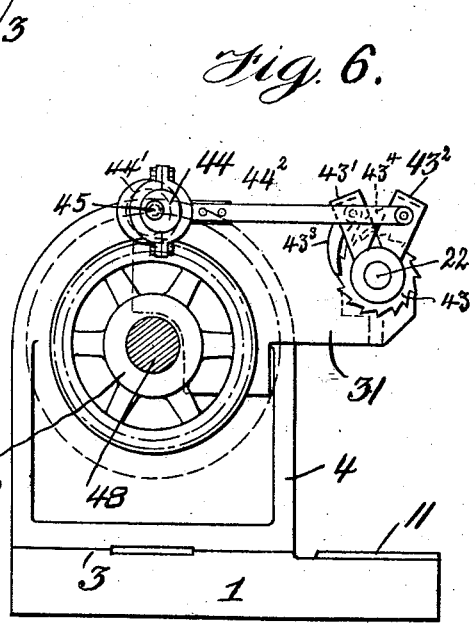

Figure 1 is a plan of my improved machine, the heads thereof being diagrammatically illustrated, Fig. 2 is a side elevation of the same, Fig. 3 is a plan view on a reduced scale of the base plate of the machine, Fig. 4 is an end view of the machine, Fig. 5 is a vertical sectional view of the forming and feeding rolls of the machine on the line 6—6 of Fig. 1, Fig. 6 is a detail sectional view of a portion of the machine illustrating the intermittent actuating mechanism of the forming and feeding rolls, Fig. 7 is a longitudinal sectional view on an enlarged scale of one-half of the cut-off and crowning heads, Fig. 8 is a cross sectional view enlarged of one of the heads taken on the line x—x of Fig. 7, Fig. 9 is a fragmentary plan view enlarged of one of the heads, Fig. 10 is an end view of the crowning head of the machine, Fig. 11 is a side elevation of the same, Fig. 12 is a plan of one of the punch actuating cams carried by the crowning head, Fig. 13 is an end view of the same, Fig. 14 is a developed view of a portion of the crowning head, Fig. 15 is an edge view of the punch actuating cam illustrated in Figs. 12 and 13, Fig. 16 is a plan of a portion of the crowning head illustrating the seat for the punch actuating cam, Fig. 17 is a detail sectional view of one of the forming and feeding rolls of the machine, Fig. 18 is an elevation of the form of blanks from which the nuts are produced, Fig. 19 is an end view of one of the bearings of the machine, Fig. 20 is a developed view of a portion of the cut-off head of the machine, Fig. 21 is an end view of the cut-off head, Fig. 22 is a plan of the same, Fig. 23 is an end view of a portion of one of the heads, Fig. 24 is an end view of one of the die slides employed on the machine, Fig. 25 is a side elevation, and Fig. 26 is a plan view of the same, Fig. 27 is a plan view of one of the piercer slides employed on the machine, Fig. 28 is a side elevation of the same, Fig. 29 is a diagrammatic view illustrating the various operations of forming a nut by my improved machine, Fig. 30 is a plan of the crowning head bearing of the machine.

In the production of nuts by my improved machine, I produce strips of metal approximately of the depth and width of the nuts to be formed, and feed said strips through the feeding and forming rolls of my improved machine. In case a rectangular nut is to be formed, ordinary feed rolls are used, but where hexagon, octagon or other shaped nuts are to be produced, they are partially formed between a pair of rolls especially constructed to produce two or more sides of the nut. After a nut blank has been properly treated by the forming rolls, it is gripped and moved in alinement with two dies, one of said dies severing the blank from its strip and forcing it into the crowning head or end of my machine. While in said head, plungers are actuated to provide the blank with a web, and another operation causes one of said plungers to recede, while its associate plunger moves forward and severs the web portion of the blank, the blank being retained within the crowning head by dies while the web portion is being removed. In a still further operation, the pierced and crowned blank is removed from the crowning head while one of the dies recedes and allows the web or scrap to drop into a suitable receptacle or waste chute located upon or beneath the machine.

The mechanism by which the various steps of producing a nut is accomplished consists of the following elements, which will now be separately described.

*The base plate and bearings.*—The foundation of my improved machine consists principally of a base plate 1 having pierced lugs 2, whereby it may be secured to a foundation bed. The base plate 1 at its ends is provided with raised and slotted seats 3 for a cutting head bearing 4 and a crowning head bearing 5. These bearings are bolted or otherwise secured to the base plate 1, and each bearing is provided with a central opening 6 having brasses or bushings 7 mounted therein. The bearings 4 and 5 are connected together by a tie rod 9 secured in upwardly extending pierced lugs 10 carried by said bearings.

Upon the front edge of the base plate 1 is a slotted seat 11 to which is secured a foundation frame 12 adapted to support the housings 14 of the feeding and forming rolls of the machine.

In connection with the base plate and its bearings I use two standards 15 and 16, the standard 15 being provided with two journal boxes 17 and 18, while the standard 16 is formed with one journal box 19. The standard 15 is located at the end of the base plate 1 contiguous to the cutting-off head bearing of the machine, the opening formed by the journal box 18 alining with the openings 6 of the bearings 4 and 5. The standard 16 is mounted adjacent to the standard 15 and with its journal box opening alining with the opening of the journal box 17 of the standard 15.

*The blank forming and feeding rolls.*—The housings 14 are of a conventional form commonly used for adjustably supporting rolls, and in said housings are adjustably mounted bearing blocks 20 revolubly supporting shafts 21 and 22, carrying rolls 23 and 24 respectively. The rolls 23 and 24, as illustrated in Fig. 2 of the drawings, are designed simply as feed rolls, the roll 24 being provided with a peripheral groove to receive a similar tongue carried by the roll 23, the groove and tongue providing a pass through which strips of metal are fed to the nut forming mechanism. The rolls 23 and 24 are employed during the production of square or rectangular nuts, but when octagon or hexagon shaped nuts are to be made, the rolls 23 and 24, are removed and replaced by rolls designed for producing blanks having two or more sides partially formed.

One of the rolls which would be used in connection with a hexagon or octagon nut is illustrated in Fig. 17 of the drawings, a roll 25 being scalloped as at 26, to provide a plurality of blanks 27 having rounded upper and lower sides 28. The blanks as illustrated in Fig. 18 of the drawings are all connected and partially formed, said blanks being severed and upset, to produce a perfect nut as will be hereinafter described.

The housings 14 upon their front sides are provided with a funnel-shaped guide 29, (the guide being removed in Fig. 2 and shown in Fig. 5,) while the rear sides of the housings are provided with a guide 30, said guides extending inwardly beneath the roll 23 in close proximity to the pass of the rolls, whereby a strip of metal entering the guide 29 will pass between the rolls and into the guide 30, from whence it is carried to a point to be gripped and operated upon by the remainder of my machine.

*Roll operating mechanism.*—The cut-off head bearing 4 is provided with a bracket 31 having journal boxes 32 for the prolonged end of the shaft 22 of the roll 24. Upon said shaft intermediate the inner one of the journal boxes 32 and the housings 14 is slidably keyed a clutch member 33, said member being adapted to mesh with a clutch member 35, carried by a spur wheel 36 fixed upon the shaft 22. The shaft 22 is also prolonged upon the opposite end of the housings 14 and is provided with a hand wheel 37 whereby the rolls 23 and 24 may be rotated to properly position a strip of metal to be operated upon by the remainder of my improved machine. The roller 23 is mounted on a shaft 21, and rotary movement is transmitted to the shaft 21 through the medium of a spur wheel 38 carried by said shaft and meshing with the spur wheel 36.

To move the clutch member 33, I provide the supporting frame 12 of the housings 14 with guide brackets 39 for a clutch operating lever 40. One end of the lever is provided with a suitable handle 41 while the opposite end of the lever is connected to a stirrup 42 loosely connected to the clutch member 33. To move the clutch member 33 in and out of engagement with the clutch member 35, the lever 40 is reciprocated.

The rolls 23 and 24 are intermittently actuated, and to accomplish such a movement of said rolls, I provide the end of the shaft 22 beyond the bracket 31 with alternately actuating ratchet mechanisms. The shaft 22 is provided with a ratchet 43, and swinging on the shaft 22 and embracing the ratchet are two yoke frames 43'—43² carrying pawls 43³—43⁴ respectively, the pawls engaging the teeth of the ratchet. Two oppositely disposed eccentrics 44—44' are carried by a stub shaft 45 journaled in the bracket 31, the eccentrics being connected to the yoke frames, by rods 44²—44³. By this means, when the stub shaft 45 is actuated, the eccentrics will alternately operate the yoke frames and pawls and intermittently rotate the shaft 22, as will be obvious, to produce the required intermittent movement of the feed rollers. The stub shaft 45 carries a spur wheel 46 meshing with a spur wheel 47 keyed upon a shaft 48, said shaft being journaled in the brasses or bushings 7 of the head bearings 4 and 5 and in the journal box 18 of the standard 15. Upon the shaft 48 contiguous to the standard 15 is keyed a large spur wheel 49, said spur wheel meshing with a small spur wheel 50 secured upon the end of a shaft 51 journaled in the boxes 17 and 19 of the standards 15 and 16 respectively. The shaft 51 is driven through the medium of belt wheels 52 mounted upon said shaft between the standards 15 and 16, or it may be driven directly or indirectly from an electrical source of energy.

*The cut-off head.*—The cut-off head comprises three members, two of which 66—89 are keyed upon the shaft 48, while the third member 53 is preferably formed integral with the cut-off head bearing 4 and is formed with annular collars or flanges 54 and 54', the outer faces of said collars or flanges forming cam surfaces or shoulders designated respectively 55 and 56, these parts to be designated as a "punch groove" and a "die groove" respectively. These grooves are annular, except at one point located at approximately an angle of forty-five degrees with relation to the vertical axis of the cut-off head bearing 4. At this point the punch groove 55 is formed with a punch-outgoing wear surface 57 and a punch-receding cam surface 58, the apex or turning point of these surfaces being formed by a cam-block 59 detachably mounted in the shoulder of the punch groove 55.

The die groove 56 is formed with a die-outgoing cam surface 60, a straight cam surface 61, and with a die-receding cam surface 62. The cam surface 60 is provided with a detachable cam block 63, seating in the shoulder of the die groove 56, this also being true in connection with the receding cam surface 62, which is provided with a detachable wear block 64 and an auxiliary wear block 65. The blocks 59, 63, 64 and 65 are made of steel having an indurate surface capable of withstanding considerable wear before being renewed. The block 64 is illustrated more particularly in Figs. 12, 13 and 15. This block is wedge-shaped and provided with guides 64ᶜ to support the block detachably in the body of the bearing 4, as shown in Fig. 20, and a recess 64ᵇ to accommodate the auxiliary bearing block 65. It will be observed that the block 64 extends over the punch groove 55 to the die groove 56, therefore it is necessary that the block 64 be grooved as at 64ᶜ to provide a clear and continuous passage in the punch groove 55.

The member 66 of the cut-off head is formed hexagon shaped externally, the several sides of said member having dove-tail shaped guide ways 67 formed therein, which are each provided in their bottoms with a roller housing recess 68 and a web recess 69 adjacent to one end of the bearing 4.

Slidably mounted in each one of the guide ways 67 of the member 66 is a die actuating slide 70, one end of said slide being formed with a roller or cam housing 71, reinforced by a web 72 adapted to enter the recess 69 when the die slide 70 is in one position. In the housing 71 is journaled a roller or cam 73 adapted to bear upon the shoulder of the die groove 56. The journal pin 74 of said roller or cam projects towards the shaft 48 and bears upon the inner side of said groove. The slides 70 are formed with dove-tail shaped guide ways 75, plunger guides 76, and die guides 77. In the guide ways 75 of the slide 70 are mounted punch actuating slides 78 having a housing 79 for a roller or cam 80, similar to the die actuating slide 70, said roller or cam bearing against the shoulder of the punch groove 55. The punch actuating slide 78 is provided with a bearing 81 for a punch 82, said punch being secured in the bearing 81 by a set screw 83. The punch 82 extends also through the guide 76 and through a die 84 mounted in a box 85, carried within the die guides 77 of the die actuating slide 70. The box is retained within the guide 77 by a plate 86 and screw bolts 87, said screw bolts engaging in the die actuating slide 70 upon each side of the box 85. In order that the die 84 can have a firm bearing in its actuating slide 70, I preferably make the lower section of the box 85 of greater length than the uppermost section. Thus far it will be observed that the member 66 carries six die-actuating slides and dies and six punch actuating slides and punches, all of which are independently actuated and controlled by the slide and punch grooves of the cut-off head bearing. The dies 84 are detachably mounted in their respective slides whereby they may be renewed and replaced with dies of various shapes as will hereinafter appear. The punches 82 can also be removed and renewed at any desired time.

Keyed upon the shaft 48 between a collar 88 formed upon said shaft and the cut off head member 66 is an annular die plate 89, said die plate having shouldered openings 90 formed therein adapted to aline with the guide box 85 of the member 66 and receive the ends of the guides 84 and the plunges 82. The shouldered openings 90 of the die plate 89 are provided with solid or two-part die blocks 91, through which the dies 84 pass, said die blocks being retained within the plate 84 by set screws 92.

*The crowning head.*—The crowning head is very similar to the cut-off head, consisting of the bearing 5, a slide head 93 corresponding to the cut-off head member 66, and a die plate 94 corresponding to the die plate 89, the die plate 94 being arranged to confront the die plate 89 of the cut off head, whereby nut blanks can be operated upon between said plates and in the die blocks thereof. The only structural differences between the cut-off head and crowning head reside in the cam grooves and the dies for crowning the nuts before their completion.

The annular shoulders and flanges of the bearing 5 are formed with a die groove 95 and a punch groove 96. The grooves are annular with the exception of one point located at a point approximately at an angle of forty-five degrees to the vertical axis of the bearing 5, and approximately in longitudinal alinement with the cam surfaces of the punch and die grooves upon the cut-off end of the machine. The die groove 95 is formed with an angular cam or roller surface 97 for forcing the die inwardly, a straight surface 98 and a cam or roller surface 99 for forcing the die outwardly, these surfaces being formed upon one side of the die groove 95 by a cam wear block 100 detachably mounted in the shoulder of said groove.

The punch groove 96 is formed with a cam or roller receding surface 101, a primary cam or roller projecting surface 102, and a secondary cam or roller projecting surface 103, all of which are formed by a block 104 detachably and resiliently mounted in the crowning head bearing. The block 104 is recessed to accommodate auxiliary wear blocks 108 and 109. As the block 109 in its entirety performs a very important function in connection with the production of nuts by my improved machine, I resiliently retain the same within the crowning head bearing by a spring 110, said spring being secured to the end of the bearing 5 directly beneath the pierced lug 10 thereof by screw bolts 106, as shown in Fig. 30. The function of this spring will be more fully set forth hereinafter.

*General operation.*—In order that the operation of the nut making machine may be fully understood, I have indicated approximately five different points (see Fig. 5) where the steps of forming a nut take place, these steps being designated A, B, C, D, and E, and have also illustrated these various steps in Fig. 29. From the position of these points it will be observed that the crowning and cut-off heads rotate but a slight distance from the time a nut blank is received to the time it is finished, and that approximately four sets of the dies and punches are idle while the remaining punches and dies are operating. Assuming that hexagon shaped nuts are to be formed and that suitable strips of metal have been provided, one strip at a time is fed between the rolls 23 and 24. As it passes through the guide 29 and is impinged by said rolls, the nut blanks as illustrated in Fig. 18, are formed and fed through the guide 30 to the point A between the cut-off and crowning heads of the machine. About this time, the die 84 upon the cut-off side of the machine is actuated by the die outgoing cam or roller surface 60, through the medium of the die slide 70. The punch 82 remains stationary during the movement of the die 84. As the die 84 engages the first nut blank, at the point A, it is pressed and held against the crowning head, carried forward to the point B and forced into the die blocks 91 of the crowning head of the machine, this movement of the first blank 27 and the dies 84 causing said blank to be severed from the remaining nut blanks. This is accomplished by the sharp and abrupt edges of the die blocks 91 carried by the crowning head of the machine. The complete operation just described is indicated at B (Fig. 29), and the next step in the formation of a nut occurs at the point C (Fig. 5).

When comparing the operations in connection with Figs. 20 and 14, it should be borne in mind that the cut-off head (Fig. 20), is rotating in the direction of the arrow of said figure, while the crowning head (Fig. 14) is rotating in the direction of the arrow of said figure. At the point C the dies 84 of the cut-off head and the crowning head are held stationary. The punch 82 of the crowning head is moved outwardly by the cam outgoing surface 103, this being accomplished through the medium of the punch actuating slide 78 of the crowning head. Simultaneous with this movement, the punch 82 of the cut-off head is moved forward by the cam or roller outgoing surface 57 of the cut-off head, said movement being accomplished through the medium of the punch slide 78. The outward movement of the punches 82 provides the nut blank 27 with a web 111.

In forming the web 111, the nut blank 27 is upset or expanded, to perfectly form four of the hexagon sides of the nut. This is illustrated in Fig. 18, where it will be observed that the full line contour of the nut blank allows the same to easily enter the die blocks 91, of the crowning head, and that as the nut is nearly completed at the point C, it will be readily upset or expanded to the dotted line contour illustrated in Fig. 18. The revolving cut-off and crowning heads now move to the point D, the dies 84 of said heads remaining stationary. The punch 82 of the crowning head is moved outwardly by the cam or roller surface 102, this movement being accomplished through the medium of the punch slide 78 of the crowning head. The punch severs the web 111 and forces said web into the die 84 upon the cut-off side of the machine. This is permitted by the punch 82 of the cut-off head receding when traveling down the cam or roller receding surface 58 of the cut-off head. The heads of the machine now move to the point E, where a double movement takes place upon the crowning side of the machine and a single movement upon the cut-off end of the machine. The punch 82 of the crowning head is moved rearwardly, through the medium of the punch slide 78 engaging the cam or roller receding surface 101 of the crowning head. The die 84 of the crowning head is moved forward by the die slide 70 engaging the die outgoing cam or roller surface 99 of the crowning head. The outward movement of the die 84 of the crowning head ejects the nut blank from the die blocks 91, allowing the same to drop between the heads of the machine in to a suitable receptacle or chute placed beneath the point E. Upon the cut-off side of the machine, the punch 82 stands stationary while the die 84 containing the severed web 111 is moved rearwardly, through the medium of the die roller or cam receding surface 62 of the cut-off head. This movement of the die 84 causes the severed web 11 to impinge the punch 82 of the cut-off head, and as the die surrounding said punch recedes beyond the end of the punch, the severed web will be removed from the die 84 and permitted to drop between the cut-off and crowning heads of the machine. A further movement of the heads of the machine causes the die slide 70 of the crowning head to move rearwardly through the medium of the die cam and roller receding surface 97, this movement of the die slide placing the die 84 in its normal position, where it remains until the heads have almost completed a revolution, when the dies and punches just described will again be placed in operation at the point A.

I resiliently mount the cam 109 in the crowning head owing to the fact that it may be necessary for said cam to recede when a nut blank is being provided with the web 11 at the point C. I have found by actual experiment that some nut blanks are more tenacious than others and more difficult to upset or expand at this point of the operation, therefore in order to prevent the punches 82, the dies 84, or their mechanism, from being broken, I resiliently hold the cam 109.

In using the eccentric 44 and the ratchet mechanism 43, an intermittent movement is imparted to the feed and forming rolls 23 and 24, this being essential in order that the punches and dies of the cut-off heads of the machine may be successively moved into position to grip a blank projecting from the guide 30 of the feed or forming rolls.

From the foregoing description, it will be observed that I have devised a novel machine having a mechanism for feeding and forming equally spaced nut blanks, and revoluble heads or members mounted in advance of said mechanism for compressing said blanks, providing the blanks with webs, and then punching said blanks, said heads or members embodying a plurality of circumferentially arranged die blocks or sockets in which dies and punches are operated.

It it obvious that any desired number of die blanks or sockets, together with dies and punches can be used in connection with each head or member of the machine.

What I claim and desire to secure by Letters Patent, is:—

1. In an apparatus of the class described, a supporting base, spaced bearings carried by said base, a stationary cut-off head member and a stationary crowning head member carried by said base and provided respectively with spaced cam faces, a shaft journaled in said bearings, movable cut-off head members and movable crowning head members carried by said shaft and rotative therewith, die slides spaced apart and movably disposed in the movable portions of said cut-off head members and crowning head members, a plurality of dies movably-mounted in said die slides and adapted to be operated by said cam faces, a plurality of punches movable through said dies and adapted to be operated by other of said cam faces, and means for continuously rotating said shaft and the members carried thereby.

2. In an apparatus of the class described, a supporting base, spaced bearings carried by said base and provided respectively with a stationary cut-off head member and a stationary crowning head member provided respectively with spaced cam faces, a shaft journaled through said bearings, a movable cut-off head member and a movable crowning head member carried by said shaft and provided with spaced peripheral guide ways, die slides movably-engaging said guide ways and formed with longitudinal guide ways, said die slides provided with bearing rollers adapted to engage said cam faces, punches movable through said die slides and provided with bearing rollers adapted to engage said cam faces, tubular dies detachably supported in said die slides and through which said punches are movable, and means for continuously rotating said shaft and the members carried thereby.

3. In an apparatus of the character described, a supporting base, spaced bearings carried by said base and provided respectively with a stationary cut-off head member and a stationary crowning head member having spaced cam faces, a shaft journaled in said bearings, a movable cut-off head member and a movable crowning head member carried by said shaft with their confronting faces spaced apart and provided with spaced die guides through which the dies extend, die slides movably-engaging said die guides, punches movable through said die slides and provided with rollers engaging said cam faces, dies supported in said die guides and through which said punches are movable, and means for continuously rotating said shaft and the members carried thereby.

4. In an apparatus of the class described, a supporting base, spaced bearings carried by said base and provided respectively with a stationary cut-off head member and a stationary crowning head member each having spaced cam faces, a shaft journaled in said bearings, a movable cut-off head member and a movable crowning head member spaced apart and carried by said shaft, die slides movably-mounted upon said movable cut-off member, die slides movably-mounted upon said movable crowning head member, punches operating through the dies of said movable cut-off head member, punches operating through the dies of said movable crowning head member, said dies and punches adapted to be operated respectively by said cam faces, and means for continuously rotating said shaft and the members carried thereby.

5. In an apparatus of the class described, a supporting base, spaced bearings carried by said base and provided respectively with a stationary cut-off head member and a stationary crowning head member spaced apart and provided with cam faces and cam grooves, a shaft journaled in said bearings, a movable cut-off head member and a movable crowning head member spaced apart and carried by said shaft, die slides carrying tubular dies movably-mounted upon said movable head members and provided with rollers adapted to respectively engage said cam faces and with studs respectively engaging said cam grooves, punch slides movable in said die slides and carrying punches movable through said dies, said punch guides provided with rollers adapted to respectively engage said cam faces and with depending studs engaging the cam grooves, and means for continuously rotating said shaft and the members carried thereby.

6. In an apparatus of the class described, a supporting base, spaced bearings carried by said base and provided respectively with a stationary cut-off head member and a stationary crowning head member having spaced cam faces, a shaft journaled in said bearings, a movable cut-off head member and a movable crowning head member, spaced apart and carried by said shaft, die slides movably-mounted upon said movable cut-off head member and movable crowning head member and carrying dies adapted to be operated by said cam faces, punches movable through said dies and adapted to be operated by said cam faces, means for continuously rotating said shaft and the members carried thereby, a housing carried by said base, shafts mounted in said housing, feed rollers carried by said shafts, ratchet wheels carried by the shaft of one of said feed rollers, pawls operatively connected to said ratchet wheels, eccentrics operatively connected to said pawls, and means whereby the motion of said continuously rotating shaft is communicated to said eccentrics.

7. In an apparatus of the class described, the combination with a base support, a driving shaft mounted for rotation through said base, a cut-off head and a crowning head each comprising a stationary portion and a revolving portion, the revolving portions being connected to said shaft and with their confronting faces spaced apart, dies movably-disposed respectively in said cut-off head and said crowning head, punches operating through said dies, means carried by the revolving portions of said cut-off head and said crowning head members for engagement with the stationary portions of said members, means for actuating said drive shaft and the members of the cut-off head and crown head carried thereby, and means for intermittently actuating said dies and punches.

In testimony whereof I affix my signature in the presence of two witnesses.

ULYSSES G. DAVIS.

Witnesses:
MAX H. SROLOVITZ,
A. J. TRIGG.